United States Patent
Attinger et al.

(10) Patent No.: US 10,457,904 B2
(45) Date of Patent: Oct. 29, 2019

(54) MINIATURIZED CONTINUOUS-FLOW FERMENTING APPARATUS

(71) Applicant: IOWA STATE UNIVERSITY RESEARCH FOUNDATION, INC., Ames, IA (US)

(72) Inventors: Daniel Attinger, Ames, IA (US); Liang Dong, Ames, IA (US); Yuncong Chen, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 295 days.

(21) Appl. No.: 15/293,992

(22) Filed: Oct. 14, 2016

(65) Prior Publication Data
US 2017/0107465 A1    Apr. 20, 2017

Related U.S. Application Data

(60) Provisional application No. 62/242,033, filed on Oct. 15, 2015.

(51) Int. Cl.
| | | |
|---|---|---|
| C12G 3/02 | (2019.01) | |
| C12C 11/09 | (2006.01) | |
| C12G 1/02 | (2006.01) | |
| B01L 3/00 | (2006.01) | |
| F16K 99/00 | (2006.01) | |

(52) U.S. Cl.
CPC .............. *C12G 3/02* (2013.01); *B01L 3/5027* (2013.01); *C12C 11/09* (2013.01); *C12G 1/0203* (2013.01); *C12G 1/0206* (2013.01); *F16K 99/00* (2013.01)

(58) Field of Classification Search
CPC ........ C12G 1/064; C12G 3/02; C12G 1/0203; C12C 11/09

USPC .......... 99/276, 277, 278, 323; 426/112, 124, 426/422, 477
See application file for complete search history.

(56) References Cited

U.S. PATENT DOCUMENTS

| 4,792,454 A | 12/1988 | Lemonnier | |
|---|---|---|---|
| 2011/0174734 A1* | 7/2011 | Seibert ............... | B01D 67/0093 210/650 |
| 2014/0322099 A1 | 10/2014 | Zhou et al. | |

FOREIGN PATENT DOCUMENTS

| EP | 0236751 A2 | 9/1987 |
|---|---|---|
| WO | 2008156837 A1 | 12/2008 |
| WO | 2009100028 A1 | 8/2009 |

OTHER PUBLICATIONS

Iowa State University Research Foundation, Inc., PCT/US2016/057131, filed Oct. 14, 2016, "The International Search Report and The Written Opinion of the International Searching Authority, or the Declaration" dated Jan. 17, 2017, 11 pages.

(Continued)

*Primary Examiner* — Phuong T Nguyen
(74) *Attorney, Agent, or Firm* — McKee, Voorhees & Sease, PLC

(57) ABSTRACT

A system, method, and apparatus for the fermentation of a beverage by use of continuous flow is provided. The fermented beverage can be any of a wine, beer, mead, ale, soda, cider, or other. The invention provides for small-scale fermentation that can be done in a much shorter time than previous batch fermentations. The small-scale and shortened time allows for variables to be introduced and tested to produce new varieties, flavors, qualities, and other combinations that are inputs of the fermented beverage.

3 Claims, 7 Drawing Sheets

(56) References Cited

OTHER PUBLICATIONS

Cho, T., et al. "Multimembrane Bioreactor For Extractive Fermentation", Biotechnology Progress (1986) vol. 2, No. 1, pp. 53-60.
Doran, et al. "Effects of Immobilization on Growth, Fermentation Properties, and Macromolecular Composition of *Saccharomyces cerevisiae* Attached to Gelatin", Biotechnology and Bioengineering, vol. XXVIII, pp. 73-87 (1986).
Genisheva, et al. "Immobilized Cell Systems for Batch and Continuous Winemaking", Trends in Food Science & Technology 40 (2014), pp. 33-47.
Genisheva, et al. "Integrated Continuous Winemaking Process Involving Sequential Alcoholic and Malolactic Fermentations with Immobilized Cells", Process Biochemistry 49 (2014), pp. 1-9.
Kourkoutas, et al. "Immobilization Technologies and Support Materials Suitable in Alcohol Beverages Production: a Review" Food Microbiology 21 (2004), pp. 377-397.
Pretorius, Isak S. "Tailoring Wine Yeast for the New Millennium: Novel Approaches to the Ancient Art of Winemaking", Yeast 2000; 16: pp. 675-729.

\* cited by examiner

MINIATURIZED CONTINUOUS-FLOW FERMENTING APPARATUS

CROSS-REFERENCE TO RELATED APPLICATIONS

This application claims priority to Provisional Application U.S. Ser. No. 62/242,033, filed on Oct. 15, 2015, which is herein incorporated by reference in its entirety for all purposes.

FIELD OF THE INVENTION

The invention relates generally to the fermentation process of a beverage, such as wine, beer, or other fermented beverages. More particularly, but not exclusively, the invention is directed towards a miniaturized fermentation apparatus, system, and method that allows for rapidly screening for the best qualities of the parameters involved in the fermentation of a beverage, such as wine, beer, or other.

BACKGROUND OF THE INVENTION

Wine is typically produced in large batches, with volumes typically in the range of 10-100,000 L. Grape juice is mixed with yeast, which consumes the sugars in the juice. Carbon dioxide and alcohol is released during the consumption of the sugar by the yeast, fermenting the juice to create the wine. Alcoholic fermentation occurs within one to two weeks, and the remaining winemaking operations occur within weeks to months. Yeast cells are dispersed in the juice. Monitoring of fermentation and production is done by sampling.

Because of the traditional method of making wine, testing is slow and cumbersome. Sometimes, an entire batch of wine can be ruined.

Furthermore, because of the slow and lengthy process of traditional batch-style winemaking, there is little chance to adjust the variables, such as type and amount of yeast and grape combination, temperature of fermentation, amount of light, as well as other factors that could affect the taste, alcohol content, and other factors that determine the quality of wine produced. Climate and maturation differences vary from year to year, which makes it difficult to evaluate the effect of modifications in the winemaking process. Quality improvements in winemaking occur by incremental modifications, usually once a year.

Therefore, there is a need in the art for a quick and simple method of screening the variables of winemaking in an easier fashion to determine the best combinations for creating higher qualities of wine.

Furthermore, other fermented beverages, such as beer, mead, ciders, sodas, ales, etc., also include various combinations of yeasts and other ingredients. Similarly, these fermented beverages are generally done on a large scale, and a single input could affect the end result of the beverage.

Therefore, it is also a need in the art for a system, method, and apparatus for testing variable of fermentation of other beverages.

SUMMARY OF THE INVENTION

Therefore, it is a primary object, feature, and/or advantage of the invention to improve on and/or overcome the deficiencies in the art.

It is another object, feature, and/or advantage of the invention to provide a miniaturized continuous-flow winery.

It is yet another object, feature, and/or advantage of the invention to provide a winemaking process with reduced alcoholic fermentation time.

It is still another object, feature, and/or advantage of the invention to provide a winemaking apparatus, system, and method that provides for greater control of gradients of the winemaking conditions.

It is a further object, feature, and/or advantage of the invention to control the type of yeast and temperature of the process to produce near infinite combinations of variables for producing wine.

It is yet a further object, feature, and/or advantage of the invention to aid in improving large-scale winemaking processes in ever-changing climate conditions.

It is still a further object, feature, and/or advantage of the invention to provide an apparatus, system, and/or process that could be used to produce generally any fermented beverage.

These and/or other objects, features, and advantages of the invention will be apparent to those skilled in the art. The invention is not to be limited to or by these objects, features and advantages. No single embodiment need provide each and every object, feature, or advantage.

According to some aspects of the invention, a miniaturized, continuous-flow beverage fermenting apparatus, system, and method is provided that includes immobilized yeast cells, mass transport via porous membranes, inline alcohol sensing, and temperature control. The components could be used with grape juice, for example, to produce wine. However, other fermented beverages are also contemplated to be produced with the invention.

It is contemplated that the system be used to rapidly screen for the best quality of fermented beverage, such as by adjusting the parameters involved with making the fermented beverage, which could include, but is not limited to, yeast types and fermentation temperature.

BRIEF DESCRIPTION OF THE DRAWINGS

Various embodiments of the invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

The invention is for a beverage fermenting system, which utilizes a continuous flow rather than batch approach for the fermentation of a beverage, such as a fermentation of grape juice to make wine. This is done on a miniaturized or very small scale, such as wherein the volume produced by the system may be on the order of 1 ml per unit. The alcoholic fermentation can occur within one to three days, as opposed to one to two weeks, which is required for large batch alcoholic fermentation. To accomplish such, and as will be understood, the yeast is not dispersed in the liquid, such as grape juice, but is separated from the liquid by a porous hydrophilic membrane, and from the ambient air by hydrophobic membrane. In-line electrical impedance sensing monitors the alcohol content of the liquid as it is circulated through the system. An alcohol sensor and/or temperature control can be integrated with the system as well to monitor the system and to control the variable of temperature during the fermenting process. For example, the temperature could be controlled via integrated thermoelectric planar elements. As will be understood, the miniaturized, continuous flow system provided by the present disclosure will allow for greater variability in the factors that go into the fermentation of a liquid, such as yeast type, flavorings, temperature, humidity and/or some combinations thereof, to allow for greater flexibility and testing to be able to create potentially new types of fermented beverages based on the alterations of the input variables. However, it is believed that the invention will allow quick and easy testing to screen two critical winemaking parameters, the yeast type and the operating temperature.

The invention can both improve the quality of fermented beverages, such as wines, beers, ales, ciders, meads, sodas, etc., by testing different variations of inputs, and can also provide for future planning in beverage production. For example, as the earth's climate is changing, this could affect the fermentation and qualities of fermented beverages created using traditional systems and methods. The beverage fermenting system 10 of the invention will help develop and adapt these processes to changing climates, such as by testing different types of yeast and other variables at different climates, such as higher temperatures. The long term outcome is envisioned to be a more robust and vibrant fermented culture, even assuming some of the changes in climate.

Figure 6:
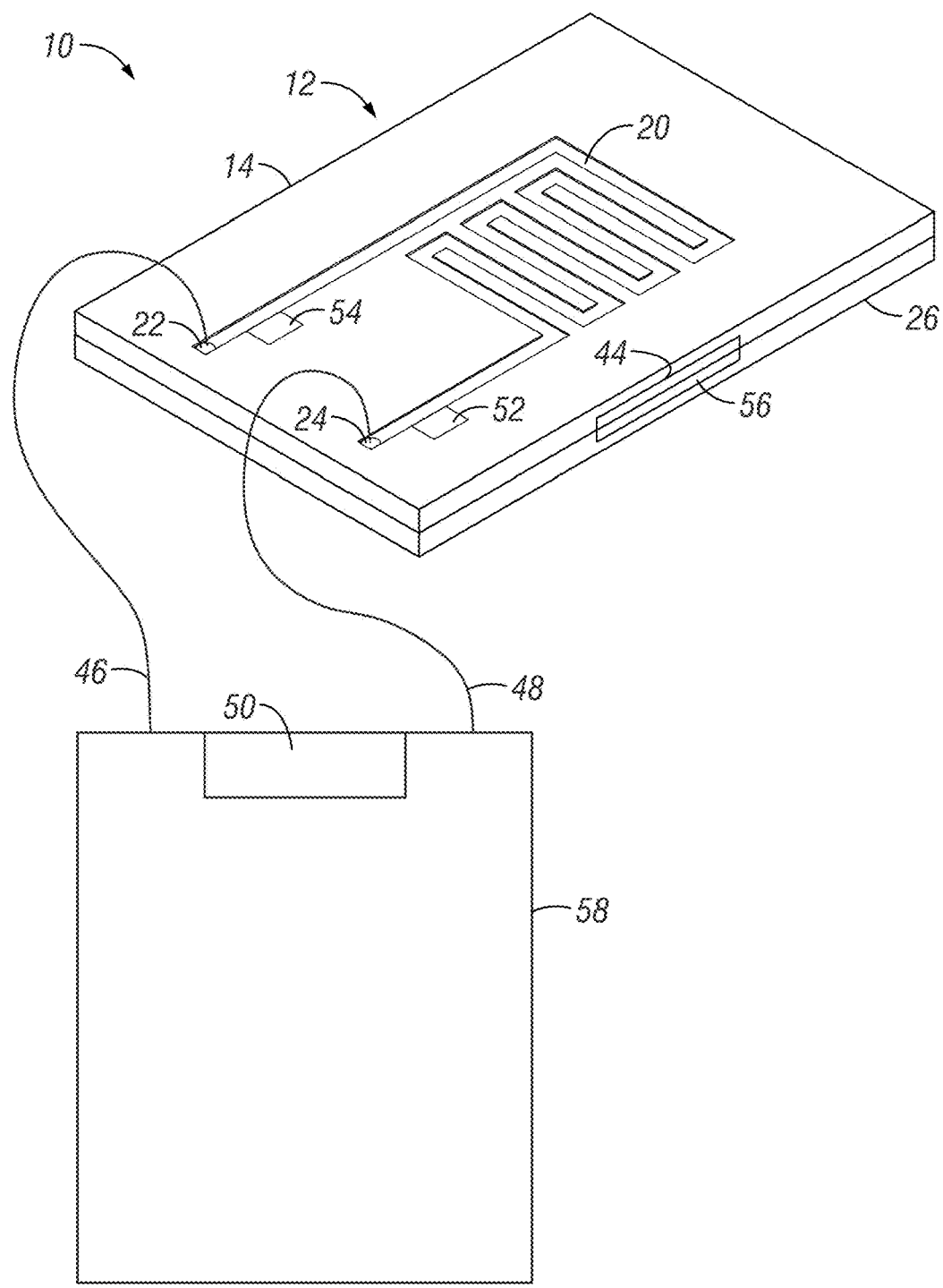
FIG. 6 is a schematic of a beverage fermenting system according to aspects of the invention.

Therefore, the figures show exemplary aspects of the invention, which provide for providing an apparatus, system, and/or method for fermenting a beverage in a miniaturized fashion such that a small scale amount of fermented beverage can be produced with generally infinite variability. Such a system is shown in full in FIG. 6. As shown in FIG. 6, the beverage fermenting system 10 includes the components of a housing 12, which may also be known as a chip or plated housing. The housing 12 includes a first plate 14 and a second plate 26 in matingly engagement. A liquid reservoir 58 contains and amount of liquid, such as grape juice to store therein. The grape juice stored in the reservoir 58 can be pumped, such as by hydrostatic pump 50 through an inlet tube 46 and towards the chip 12. The juice enters an inlet 22 in a first plate 14, where it is passed through a channel 20. The channel 20 passes the juice adjacent an amount of yeast, such as a paste or cartridge and continued out the chip 12 via the exit 24. The juice is then circulated back to the reservoir 58 via the exit tube 48. The continuous circulation of the juice from the reservoir 58 to and from the chip 12 will allow the sugars of the juice to be consumed by the yeast in the chip 12. This interaction will cause the reaction of alcohol being formed within the juice, and carbon dioxide to be omitted from the reaction. The carbon dioxide can be omitted from the second plate 26, such as via the exhaust ports 34. A membrane can separate the yeast from the exhaust ports to prevent any liquid from escaping the chip 12. Therefore, the alcohol will continue to build within the juice as it is circulated between the reservoir 58 and the chip 12 until alcohol sensors 52 within the path can detect, such as by electrical impedance, that the alcohol content has reached a desired level. The liquid can then be removed from the system and sent for testing of beverage quality.

The components of the system are shown generally in FIGS. 1-6. FIGS. 1A-1C show various views of a first plate 14 of the housing 12 of the beverage fermenting system 10. The plate 14 shown in FIGS. 1A-1C is generally planar member in the shape of a rectangle. While a rectangular shape is shown, it should be appreciated that this is not the only shape, and generally any shaped could be utilized for the chip. It should be further appreciated that the thickness of the plate 14 is minimal to reduce the overall thickness of the chip housing 12. For example, each of a first plate 14 and second place 26 are approximately 75 millimeters by 75 millimeters by 2.9 millimeters. However, these are not the only dimensions, and it is to be appreciated that generally any thickness and area of plate could be utilized so as to keep the invention to a desired size.

Further components of the first plate 14 include a channel 20, which is formed into an interior 18 side of the plate 14. The interior side 18 is generally opposite the exterior side 16, with both sides being substantially planar. The channel 20 can be formed by machining, molding, or other process to create a recessed channel into one of the interior or exterior sides of the plate 14. However, as the first and second plates will be mating engagement, it is ideal to position the channel on the interior side of the plate 14. The channel 20 as shown in the figures starts at an inlet aperture 22 and ends at an exit aperture 24. The inlet and exit apertures 22, 24 are apertures generally through the entire thickness of the plate 14. However, as has been disclosed, the recessed channel 20 will not extend the full distance between the interior 18 and the exterior 16 of the plate, and instead will only extend a short depth. For example, according to some aspects of the invention, the depth is approximately 200 micrometers, with a width of approximately 2 millimeters. Again, these are only for exemplary purposes, and the invention contemplates that generally any depth and width be utilized to allow for a fluid to pass. Furthermore, the channel 20 as shown in the figures is shown to include a generally serpentine portion wherein the channel goes in a back and forth manner. This back and forth and/or serpentine configuration of the channel 20 will allow the juice or other liquid flowing through the channel 20 to pass adjacent an amount of yeast in such a manner that a high surface area of the yeast will be passed by the juice, thus increasing the amount of time in contact with the yeast. This will decrease the time it takes to ferment the juice by the yeast. However, it should be appreciated that while the back and forth serpentine configuration of channel 20 is utilized, this is not to be considered the only configuration that can be taken by the channel 20. For example, a circular shape, squared shape, spiral shape, or generally any other configuration which can increase the surface area and/or surface time in which the juice will pass via the yeast is to be contemplated as part of the present disclosure.

Figure 1A:
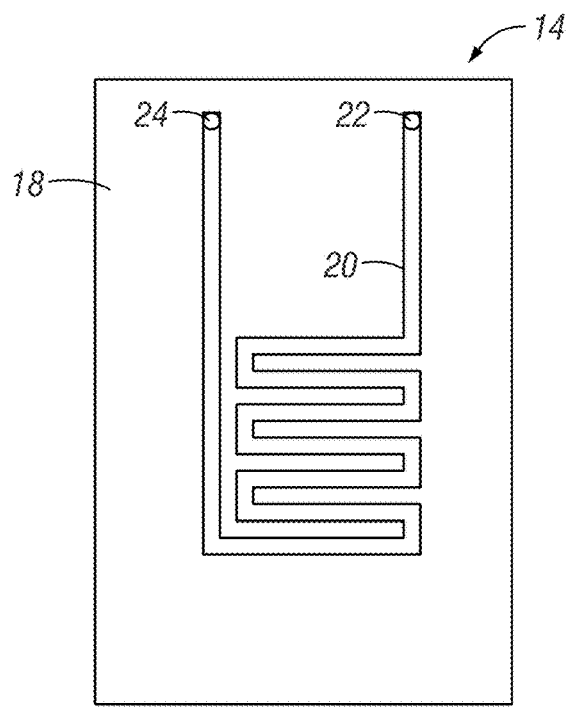
FIGS. 1A-C are views of a first plate for use with a beverage fermenting system according to aspects of the invention.
Figure 1B:
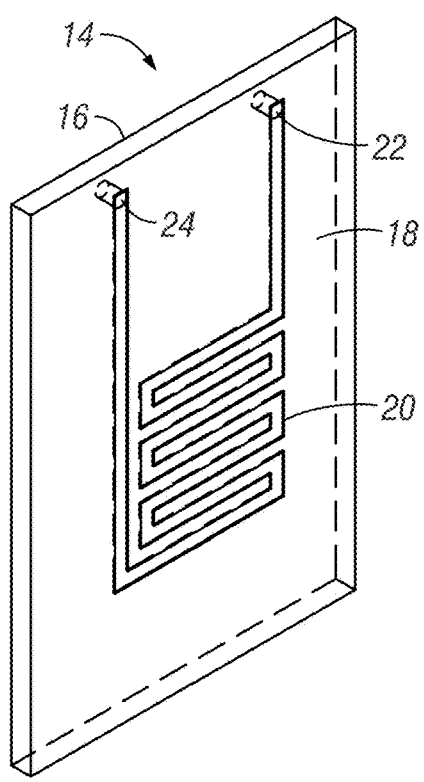
Figure 1C:
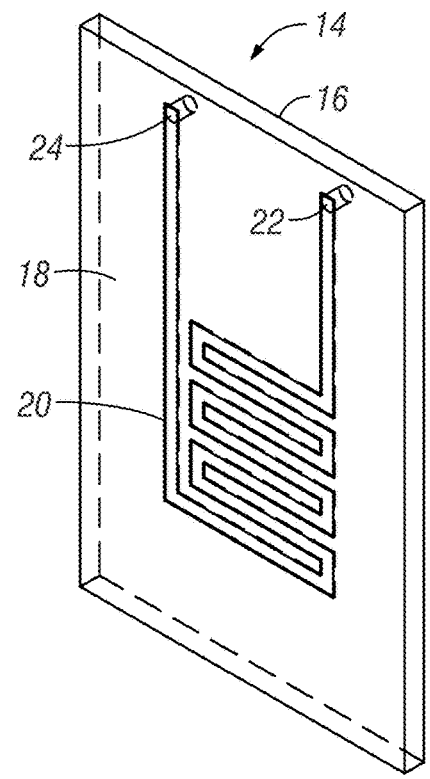
Figure 2A:
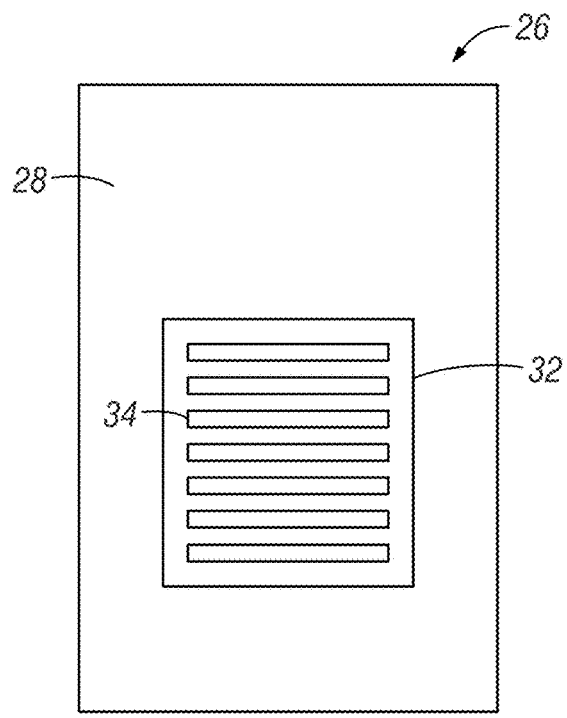
FIGS. 2A-C are views of a second plate for use with a beverage fermenting system according to aspects of the invention.
Figure 2B:
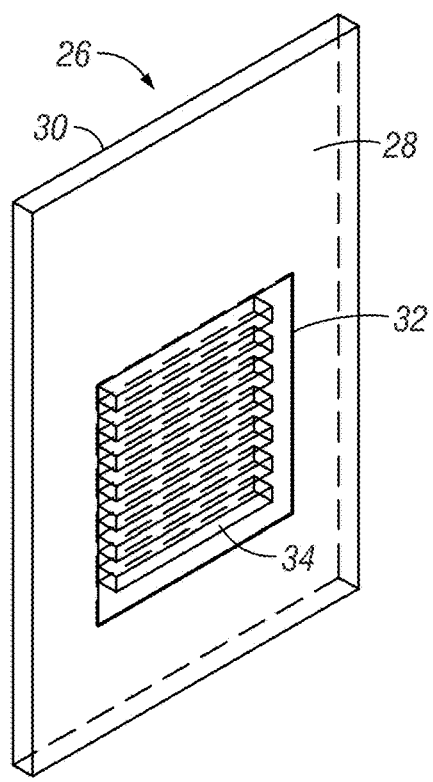
Figure 2C:
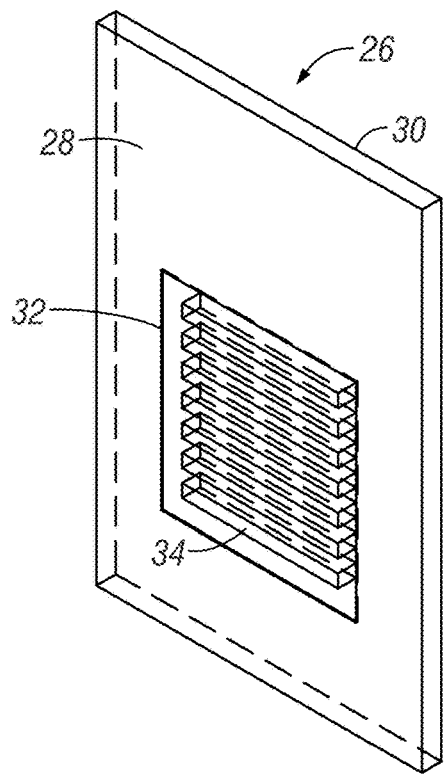

FIGS. 2A-2C show some aspects of an embodiment of a second plate 26, which can be used with the first plate 14 to form the chip housing 12. The second plate 26 takes generally the same form and/or shape of the first plate 14. Therefore, while the plates are shown as rectangular-shaped in the figures, this is not to be construed as limiting on the invention. However, for purposes of disclosure, the second plate being rectangular-shaped will be described. The plate 26 includes an interior side 28 and an exterior side 30. A recessed portion 32 is formed on the interior side 28 of the second plate 26. At the recessed portion 32 and extending from the interior side 28 to the exterior side 30 are a plurality of exhausts apertures or outlets 34. As will be understood, the exhaust apertures 34 will allow the carbon dioxide created by the reaction of the yeast and the sugars in the fermenting liquid to escape during the fermenting process. Therefore, the number, shape, and other properties of the exhaust outlets need not to be limited to that specifically shown in the figures, and can take generally any shape, size, and/or number.

Furthermore, it is contemplated that the first and second plates 14, 26 comprise a polymer material. The polymer material, such as PMMA, will provide rigidity, will also allow for flexibility in the design of the channels, outlets and other components of the plates. Furthermore, it should be appreciated that the recessed portion 32 of the second plate 26 would be generally aligned with the serpentine portion of the channel 20 as is shown in the figures. This will provide a region where the yeast can be positioned, as will be understood. Therefore, as the yeast is positioned generally in the recessed portion 32 of the second plate 26, the juice or other liquid passing through the channel in the serpentine portion will have the greatest amount of time interacting with the yeast at the recessed portion 32, wherein the fermentation time as the liquid circulates will be greatly reduced, which will produce a fermented liquid in the shortest amount of time possible. Having the outlets at generally the same location as the recessed portion 32 and the serpentine portion of the channels 20 will also provide the benefit of allowing the direct exhaust of the carbon dioxide created by the interaction between the yeast and the fermenting liquid.

Figure 3A:
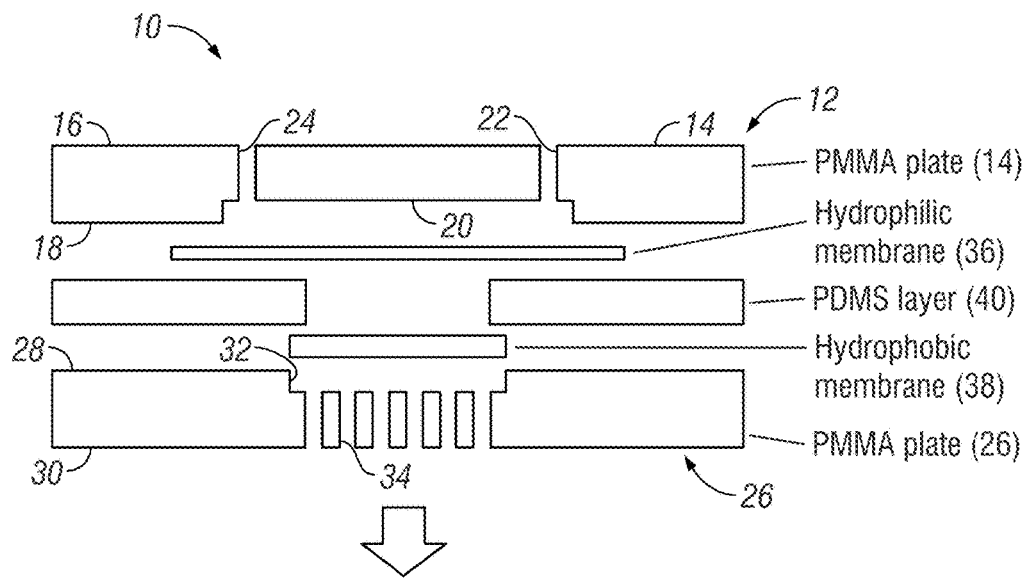
FIG. 3A is an exploded view of a beverage fermenting apparatus and system according to aspects of the invention.
Figure 3B:
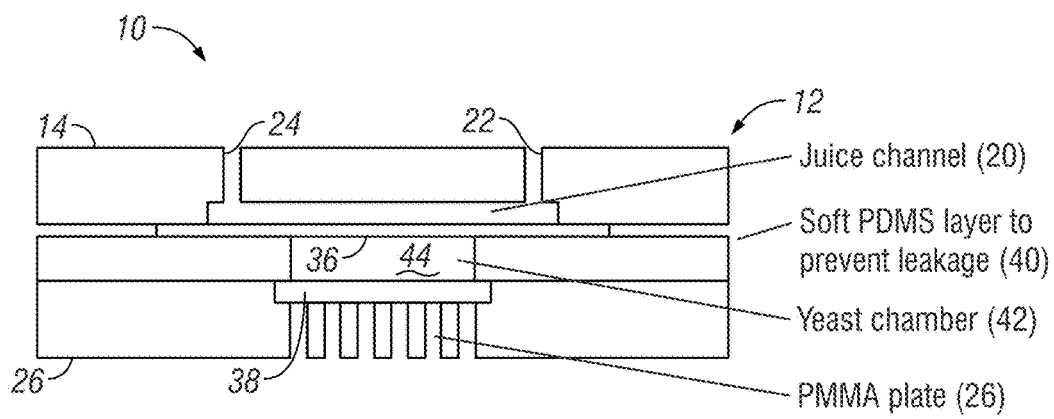
FIG. 3B is a schematic of a beverage fermenting apparatus and system according to aspects of the invention.

FIGS. 3A and 3B show additional components of the beverage fermenting system 10 including the components of the housing or chip 12. For example, FIG. 3A is a generally exploded and sectional view from an end of the housing 12 to show additional internal components thereof. As is shown, the first plate 14 is provided with the channel 20 on the interior 18, and the inlet and outlet 22, 24 apertures positioned from one side to the other. Positioned adjacent the interior 18 of the first plate 14 is a hydrophilic membrane 36. The hydrophilic membrane 36 is a water loving membrane that will pull the liquid travelling through the channel 20 towards the membrane. As will be understood, this will pull the juice towards the yeast stored in a yeast chamber 22, to increase the interaction between the juice and the yeast in order to decrease the fermentation time. The physical barrier between the yeast and the juice/wine facilitates the separation of the yeast from the wine, which is typically done in large scale wineries by sedimentation and racking. This allows for the easy sequential use of different yeasts during the same fermentation, without the need to wait—for weeks—for sedimentation to occur.

A polydimethylsiloxane (PDMS) layer 40 can be positioned generally around the recessed portion 32 of the second plate 26, which can aid in sealing the chip 12 when the first plate 14 and second plate 26 are positioned in connection or meeting with another such as shown in FIG. 3B. The layer will be outside the fermenting components of the system such that it will not affect the fermentation thereof, but it will instead seal the housing to prevent any leakage thereof.

A yeast chamber 42 is positioned adjacent the opposite side of the hydrophilic membrane 36. As has been disclosed, a yeast can be positioned within the yeast chamber 42. The yeast can be inserted such as by smearing a yeast on the backside of the hydrophilic membrane 36 or can be inserted via a cartridge or other member. Such a configuration utilizing a cartridge will allow for a quick and easy switching of yeast for a particular chip set to allow for greater variability and fermenting the liquid circulating through the system. The modularity of the yeast will allow for quick and easy variability to allow for different types of yeast to interact with the liquid to determine which yeast and liquid combination will provide the highest quality of fermented beverage for varying inputs, such as temperature, humidity and the like. Positioned on an opposite side of the yeast chamber 42 is a hydrophobic membrane 38. Hydrophobic materials are generally water repelling such that it will repel any liquid coming near it. However, the hydrophobic membrane is gas permeable to allow gases to pass there through. Therefore, the hydrophobic membrane will ensure that any juice or other liquid that could potentially pass through the hydrophilic membrane will be repelled back towards said hydrophilic membrane by the hydrophobic membrane to mitigate the possibility that the liquid will be passed out the exhaust ports 34 of the second plate 26. However, as the hydrophobic membrane 38 is gas permeable, the carbon dioxide gases created by the reaction of the yeast consuming the sugars in the fermenting liquid will be allowed to pass out, such as in the direction of the arrow shown in FIG. 3A. As is shown in FIGS. 3A and 3B, the hydrophobic membrane 38 can be positioned generally in the recessed portion 32 on the interior 28 of the second plate 26 such that it will be seated within the area in and around the exhaust ports 34 such that any fermented liquid will be repelled away from said exhaust apertures 34.

It should be appreciated and contemplated as part of the disclosure that the hydrophobic membrane could be replaced or otherwise used with a solid, non-porous membrane. In such a situation, carbon dioxide is evacuated substantially together with the fermented liquid. Still further, the solid membrane could be transparent to allow visualization of the yeast in the chip 12.

FIG. 3B shows a sectional view of a chip 12 in which the components are in mating engagement with one another. Therefore, the inlet and outlet ports 22, 24 are shown in communication with the juice channel 20, which is on an upper side of the hydrophilic membrane 36. Therefore, it can be understood that the juice will enter the inlet port 22 and be passed through the channel 20 on the upper side of the hydrophilic membrane 36 until it reaches the exit aperture 24 where it will pass back towards the liquid reservoir. The yeast chamber 42 can be filled with a yeast 44, such as by a cartridge, smear, or otherwise. The yeast chamber is a chamber generally between a bottom side of the hydrophilic membrane 36 and an upper side of the hydrophobic membrane 38 to create a chamber. Surrounding said chamber and between the outer perimeters of the first plate 14 and the second plate 26 can be a PDMS layer, which can prevent leakage of the system. As mentioned, the hydrophobic membrane 38 can be positioned in a recessed portion 32 of the interior 28 of the second plate 26. This recessed portion can include a plurality of outlet or exhaust ports 34, whereas carbon dioxide can be released through the hydrophobic membrane and out the chip 12.

Figure 4:
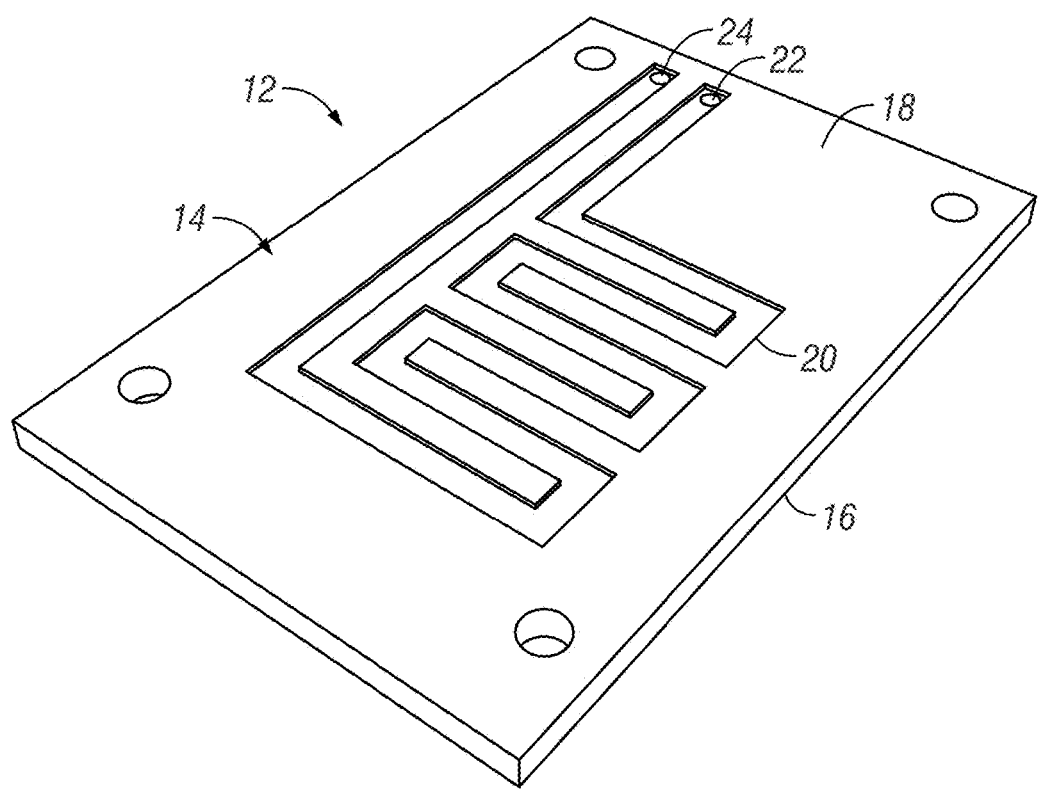
FIG. 4 is a perspective view of a first plate for use with a beverage fermenting system according to aspects of the invention.
Figure 5:
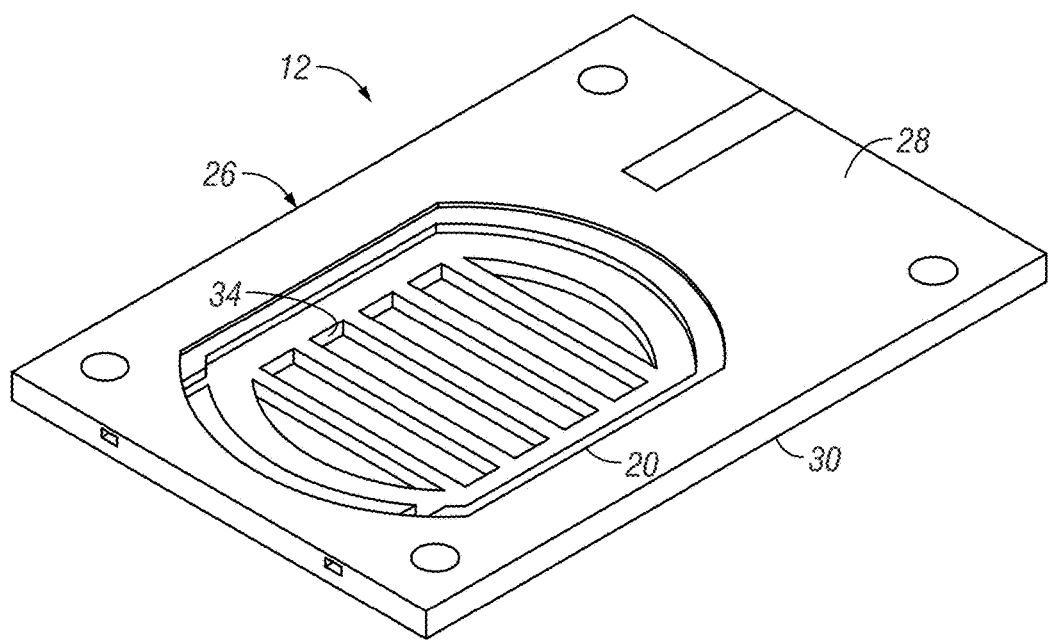
FIG. 5 is a perspective view of a second plate for use with a beverage fermenting system according to aspects of the invention.

FIGS. 4 and 5 show additional aspects of the chip housing 12. For example, FIG. 4 shows another embodiment of a first plate 14, wherein a different shaped channel 20 is included. However, the general principles of the previous system will be intact wherein the juice or other liquid will enter an inlet port 22, will pass in a serpentined manner through the channel 20 and will exit the outlet port 24 back towards the liquid reservoir. In addition, the channel 20 will be positioned generally on the interior side 18 of the plate 14.

FIG. 5 is an exemplary embodiment of another version of the second plate 26 of the housing 12. As shown in FIG. 5, the interior 28 of the plate will include a recessed portion 32 which will terminate at a plurality of exhaust ports 34. As mentioned, the recessed portion 32 will create a flange portion around the outlet section 34, wherein the hydrophobic membrane can rest on the flange portion of the recessed 32 on the interior 28 of the second plate 26.

FIG. 6 is an exemplary embodiment of a beverage fermenting system 10, as previously disclosed. For example, FIG. 6 shows the chip 12 in connection with a liquid reservoir 58. The liquid reservoir 58 contains an amount of liquid to be fermented, such as grape juice. A pump 50, such as a hydrostatic pump, can be operatively connected between the reservoir 58 in an inlet and exit tube 46, 48 which extend between the reservoir 58 and the chip 12. Therefore, the pump can be operated to circulate the liquid between the reservoir 58 and the chip 12 until such time as the liquid has fermented to a predetermined alcohol content. The alcohol content can be tested via electrical impedance monitoring, such as at the location shown by the numeral 52 in FIG. 6. Such a location is provided near the outlet 24 of the first plate 14. Therefore, the fermenting liquid has had a chance to pass through the serpentine channel 20 adjacent the yeast to allow the yeast to consume the sugars in the liquid. Such as reaction produces both carbon dioxide and alcohol, wherein the alcohol is remained in the juice. The alcoholic content will affect the electrical impedance of the liquid as it ferments, wherein the content can be determined on the impedance. Therefore, having a sensor 52 after the liquid has passed the yeast and before it exits the chip 12 will allow the best location for testing said alcohol content. The circulation can continue until such alcoholic content has reached a predetermined or chosen amount, such as based upon the type of fermenting beverage being produced by the system 10.

Further components shown in FIG. 6 include a temperature control 54, which can adjust the temperature of the liquid as it passes through the chip 12. The control of the temperature will allow for different combinations of yeast and temperature of the liquid to be tested to determine the best condition for creating the highest quality of fermented beverages based on inputs such as temperature and yeast type. As mentioned, temperatures are controlled via thermoelectric planar elements, and can be changed within seconds. In a traditional winemaking, this takes days. Further sensors and/or controls could include humidity controls to affect the humidity of the chip itself, as well as movement controls such as haptic controls. Such controls could attempt to mimic real life fermenting conditions based on different locations around the world to determine the best combinations of temperature, type of fermenting liquid, and/or yeast to produce the highest quality of fermented beverage based on said variable inputs. Therefore, it is also contemplated that different yeasts 44 could be included with the system. The yeast could be modular such that they are included on cartridges or other transport members, which can be easily inserted or applied in the system such that they could be swapped out with relative ease. Such cartridges could be slid into a slot between the first and second plates 14, 26 of the chip 12 to allow for switching out of these types. Additional cartridges could include flavorings 56, which could also be modular to allow for greater variability of the fermenting process.

Figure 7:
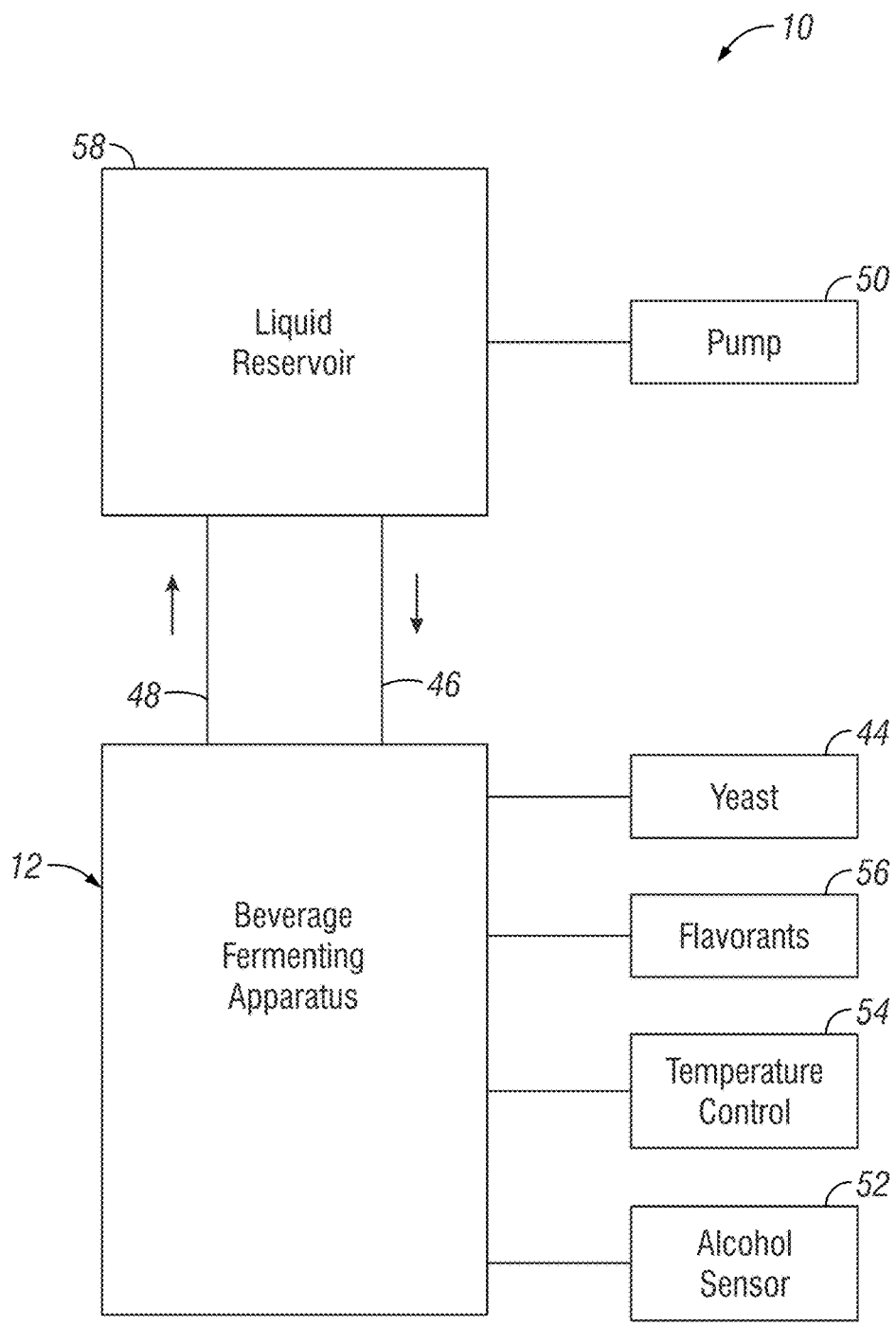
FIG. 7 is a block diagram showing components of a beverage fermenting system.

FIG. 7 shows a block diagram of the system, which can be explained in the process as follows. A fermenting liquid, such as a grape juice or other liquid can be stored in a liquid reservoir 58. A pump 50 such as a hydrostatic pump, can be operatively connected to the reservoir 58 as well as an inlet tube 46 and an exit tube 48, which extend between the liquid reservoir and the beverage fermenting apparatus 12, which is also known as the chip. The pump is operated to circulate the liquid from the reservoir 58 to and from the beverage fermenting apparatus 12. While at the apparatus 12, the juice will pass through a channel 20 as previously disclosed. The channel 20, which is separated from yeast 44 via a hydrophilic membrane 36, will allow the juice to interact with the yeast while being separated therefrom. However, as the channel is shaped and configured to allow the juice the greatest amount of time or interaction with the yeast, the amount of time for the fermentation to occur will be at a minimal. The interaction between the juice and the yeast will create both alcohol and carbon dioxide. A hydrophobic material on the opposite side the yeast will drive the alcohol towards the juice, while allowing the carbon dioxide to pass out the beverage fermenting apparatus 12, such as the outlet ports 34. The system is continued until it has been determined, such as by an alcohol sensor 52, that the juice circulated through the system has reached the desired alcohol content for the type of beverage being fermented. At this time, the fermented liquid can be tested for quality to determine whether the inputs used produced a high enough quality of fermented beverage for consumption.

Additional components as shown in FIG. 7 include a temperature control 54 and flavorings 56, which are associated with the beverage fermenting apparatus 12. For example, the temperature control 54 can adjust the temperature of the juice or other liquid as it passes through the system. This will allow testing of the fermenting process at a variety of temperatures to determine the ideal temperature to create a high quality fermented beverage based on the combination of yeast and liquid. The flavorings 56, which could be modular in nature, could be added to produce additional flavors for the fermented beverage, as may be desired for a particular fermented beverage.

Therefore, a miniaturized, continuous flow beverage fermenting apparatus and system has been shown and described. It is contemplated that the miniaturization of the system will allow for a great number of advantages. For example, the volume of fermented liquid produced by such as system is contemplated to be on the scale of 1-4 ml. This volume can be fermented in a quick manner, e.g., as short as a day. Thus, the testing can be done in a day based on the different variable inputs for fermenting the beverage to determine the best combination of inputs for creating a large scale or large batch of the same fermented beverage. In addition, mass transport is faster because it is based on diffusion over small lengths scales rather than confection diffusion. The small scale and quickness of the fermentation can allow for a greater number of recipes to be used at a single time which cannot be done in large batch fermenting, as it is now utilized. Therefore, there is more flexibility in/or experimentation with the fermenting process to determine the best recipe. In addition, the concise and fast control of the temperatures of the fermenting process can be achieved which allow for greater flexibility in both changing climates, as well as determining an ideal temperature for fermenting a liquid. For example, it is known that certain beverages such as wine, are fermented at optimum temperatures. However, due to the changing climates around the world, this may not be as easily accomplished. Therefore, by utilizing a different yeast in combination with a different grape juice, the temperature could be modified to be able to potentially raise the optimum fermenting temperature, which can allow for the wine to be fermented even with the rising climate.

It is further contemplated that the small size of the chips, which are approximate the size of a credit card, will allow for the system to be used in parallel as well. Therefore, having a large number or even any number of chips operating at the same time and with different variable inputs will allow multiple test to be accomplished at a single time. Once the beverages have been fermented, the samples produced can then be tested using conventional analytical methods for alcohol content, sugar content, and other acidity levels to determine whether the finished product is of acceptable quality.

Furthermore, due to the flexibility of the system, a large number of yeast could be tested to determine the different qualities. For example, approximately 100 types of yeast are commercially available, and each in part is specific character to a fermented beverage, such as wine. However, due to previous studies, it has been shown that only certain types of yeast can be utilized with certain grapes. However, utilizing the beverage fermenting system of the invention will allow for a greater combination of yeast and grapes to be tested to determine whether others are acceptable to produce a quality product. The same can be said with temperature, wherein additional temperatures, not previously utilized, can be tested to determine how and if they could affect the overall product and/or quality of the product.

The optimum yeast and temperature parameters determined with the beverage fermenting apparatus and system will be implemented in several larger batch of wine (~25 liters) to evaluate how the results obtained with the invention compare with larger batches, in terms of aroma and acidity.

Therefore, a miniaturized, continuous flow beverage fermenting system, apparatus, and method has been shown and described here. It should be appreciated that the figures and descriptions herein are shown for exemplary purposes, and are not to be limiting to the overall invention. For example, as mentioned, the shapes, sizes, and configurations of many of the components can be varied, while still being within the scope of the invention.

What is claimed is:

1. A miniaturized, continuous flow beverage fermenting apparatus, comprising:
    a housing comprising a first plate and a second plate, said first plate including a recessed channel, said recessed channel having a floor and opposing sidewalls defining the recessed channel;
    a hydrophilic membrane generally adjacent the first plate;
    a second membrane generally adjacent the second plate, wherein the second membrane comprises a hydrophobic membrane or a solid, non-porous membrane; and
    a polydimethylsiloxane (PDMS) layer around the outer perimeters of the first and second plates and positioned generally between the plates;
    wherein the hydrophilic and second membranes are separated to allow yeast to be positioned therebetween;
    wherein said second plate comprising a plurality of exhaust apertures therethrough; and
    wherein the recessed channel of the first plate is serpentine-shaped.

2. The apparatus of claim 1, wherein the exhaust apertures and channel are at least partially aligned with one another.

3. The apparatus of claim 1, wherein the recessed channel is positioned at an interior side of the first plate and extends towards but not to the exterior side of the first plate.

* * * * *